United States Patent

[11] 3,596,452

| [72] | Inventors | Thomas J. Scarnato Barrington; Paul C. Gordon, Hinsdale; Craig M. Lawler, Downers Grove, all of, Ill. |
|---|---|---|
| [21] | Appl. No. | 080 |
| [22] | Filed | Jan. 2, 1970 |
| [45] | Patented | Aug. 3, 1971 |
| [73] | Assignee | International Harvester Company Chicago, Ill. |

[54] GAG-LIMITING DEVICE FOR A MOWER
6 Claims, 5 Drawing Figs.

| [52] | U.S. Cl. | 56/286 |
|---|---|---|
| [51] | Int. Cl. | A01d 55/02 |
| [50] | Field of Search | 56/278, 281, 286 |

[56] References Cited
UNITED STATES PATENTS

| 274,793 | 3/1883 | Leonard | 56/286 |
| 497,816 | 5/1893 | Pridmore | 56/286 |
| 509,317 | 11/1893 | Latimer | 56/278 |
| 710,815 | 10/1902 | Stevens | 56/281 |
| 3,234,718 | 2/1966 | Wathen | 56/25 |

*Primary Examiner*—Russell R. Kinsey
*Attorney*—Noel G. Artman

ABSTRACT: A gag lift-limiting device for a mower comprising a pivoted latch having an upswung position disengaged from a cutter which is pivoted on a mower frame to permit the mower to be pivoted to transport position, the latch in its raised position having a center of gravity close to the pivot point so that the latch automatically drops from raised position to working position due to vibrations developed from operation of the mower.

A releasable lock to the latch is provided for releasably holding the latch from accidentally swinging out of gag-limiting position once the latch is so positioned.

PATENTED AUG 3 1971 3,596,452

Inventors
Thomas J. Scarnato
Paul C. Gordon
Craig M. Lawler

John J. Kowalik
Attorney

Inventors
Thomas J. Scarnato
Paul C. Gordon
Craig M. Lawler

John J. Kowalik
Attorney

GAG-LIMITING DEVICE FOR A MOWER

This invention is an improvement on the structure shown in U.S. Pat. application No. 656,527 now Pat. No. 3,540,197 filed in the name of Thomas J. Scarnato et al. on July 27, 1967.

BACKGROUND OF THE INVENTION

1. Field of the Invention

This invention is directed to pitman-type mowers and more specifically to a novel lock for the gag-limiting device such as shown and described in the above mentioned patent application and which prevents such limiting device from accidentally bouncing out of limiting position when the tractor rides over particularly rough terrain.

There are no prior art devices known to applicants in which a limiting means is provided for selectively limiting the gag lift of a mower bar; it being understood that in mowers of the type under consideration a sickle is driven by a pitman and that the angular relationship between the pitman and the sickle is critical and these cannot be positioned at a locking angle which would cause the pitman to be broken. In most instances, the latching device of the aforesaid patent application has operated satisfactorily in most conditions, however, in a condition where the tractor bounces excessively it has been found that a positive latch which is quickly and automatically operable to lock with the latch as it swings to its operative position and which cannot be disengaged to prevent the latch from momentarily swinging to a position allowing the mower bar to pivot beyond the critical angle wherein the displacement of the pitman is sufficient to cause the parts to break.

A general object of the invention is to provide novel automatic lock for the latching mechanism which limits the gagging movements of a sickle in a mower of the type under consideration.

A more specific object is to provide on the latch a novel catch which cooperates with a hook assembly mounted on the mower-supporting frame wherein the hook assembly is flexible so that as the latch swings to its latching position, the catch will automatically deflect away from the catch and reengage therewith.

A further object of the invention is to provide a novel locking means for such latch wherein the locking means is readily manually disengaged from the latch which may be swung to inoperative position in order to permit the mower to be raised manually to transport position upon the operator manually disengaging the lock.

These and other objects and advantages of the invention will become more readily apparent from the specification and the drawings; wherein.

DESCRIPTION OF THE INVENTION

Figure 1:
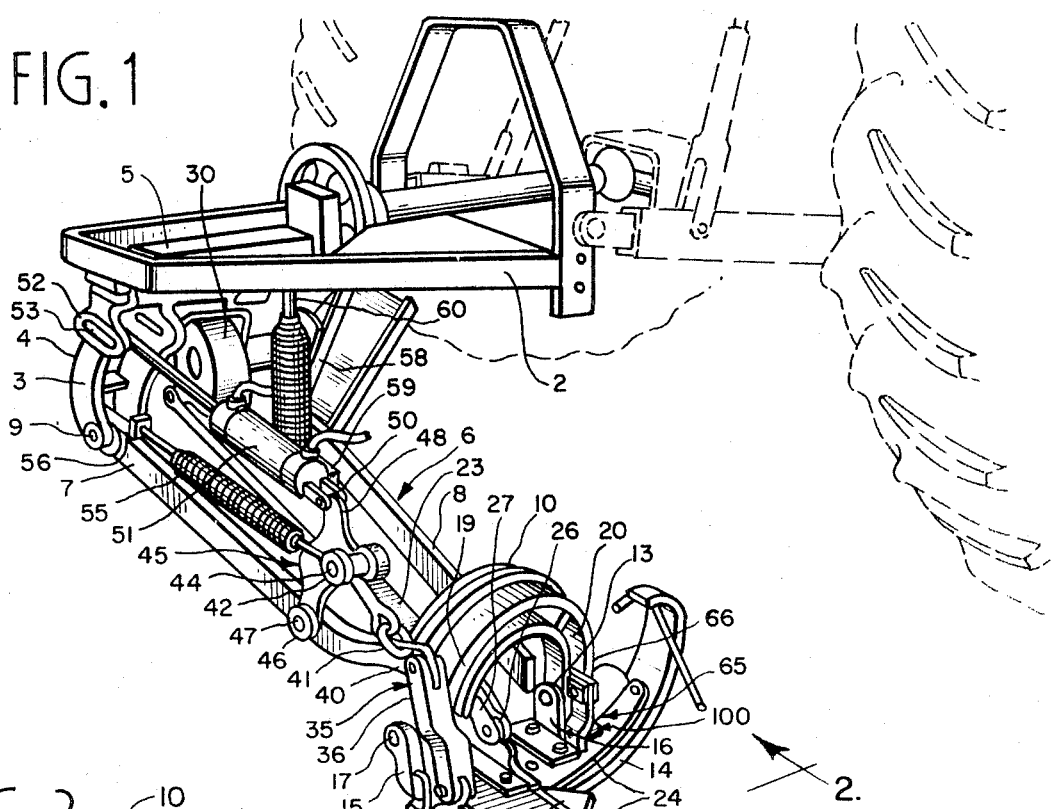
FIG. 1 is a perspective view of a mower incorporating the invention.

The invention as shown in association with a mower of the type shown and described in U.S. Pat. No. 3,302,376 which includes a supporting frame 2, a supported pendulating frame assembly 3 including a pendular member 4 which oscillates about a generally horizontal axis of the resilient coupling 5. The supported structure 3 includes a coupling frame 6 which comprises frame members 7 and 8 which have coaxial pivot mountings at their inner ends as at 9 to the lower end of the pendulum element 4. The outer ends of the frame elements 7 and 8 are intergraded with an inverted U-shaped yoke structure 10. The yoke structure 10 pivotally supports on the generally horizontal axis a mower bar or cutter generally designated 12 which includes a mower bar 13 the mower bar being mounted on an inner shoe structure 14 which has a pair of upstanding ears 15 and 16 which are respectively pivotally mounted on coaxial pins 17 and 18 to the legs 19 and 20 of the yoke structure 10.

The mower assembly 12 includes a reciprocating sickle or knife structure 22 which cooperates with conventional guards and ledger plates thereon 23, the knife assembly 22 being held in association with the ledger assembly 23 by means of hold-down clips 24 in a conventional manner as well known to those skilled in the art. The knife assembly comprises a knife head 25 which has a ball member 26 embraced by a pair of complementary socket elements 27, 27 which are connected to the lower end of a pitman 28 the upper end of the pitman being connected to a crank 30 which is rotatable supported on the pendulum member 4.

As described in the beforementioned patent, the rotation of the counterweighted crank structure 30 causes the pitman to oscillate back and forth and drive the knife assembly. The pendulum member is so arranged that it will also oscillate about the fore and aft generally horizontal axis of the coupling 5 and thereby swinging the coupling structure 6 whereby the entire supported frame structure which includes the pendulum member 4 and the elements 7 and 8 as well as the yoke member 10 together with the mower assembly 12 are also oscillated back and forth transversely of the direction of movement of the mower across a field, that is generally longitudinally of the mower bar.

In operation of the mower there are frequently times when the operator in running down the field will encounter or observe the obstructions such as stumps, stones or boulders in the path of cutter operation. He will therefore raise the mower to clear such obstruction. The linkage for accomplishing this is generally designated 35 and comprises a lifting link 36 having a lower end pivoted as at 38 to an ear 39 which is connected to the shoe structure 14 at a point outwardly and below the axis of pivot of the shoe structure on the pins 17 and 18 to the yoke 10. The upper end of the lifting link 36 is pivoted as at 40 to one end of a lost motion linkage in the nature of chain and rod assembly identified at 41, the other end of this linkage 41 being pivoted as at 42 to one leg 44 of the bellcrank lever generally designated 45. The bellcrank lever has its elbow portion 46 straddling and pivoted as at 47 to the member 7 and having its other leg 48 pivoted as at 50 to one end of a ram 51 which at its other end has a slidable pivotal mount as at 52 in a slot structure 53 in the pendulum member 4. Thus it will be seen that extension of the ram structure 51 towards the cutting mechanism 12 causes it to pivot about the horizontal pivot pins 17, 18 which are disposed transverse to the cutter and contraction of the ram assembly 51, which is a piston cylinder, causes the mower assembly to swing upwardly about the axis of the pin 17, 18. Counterbalancing tension spring 55 is connected at one end to the lever 44 and at its other end is anchored as at 56 to bracket structure which is mounted on the inner end of the frame member or coupling member 7. The entire coupling frame which includes the member 7, 8 and also yoke 10 are counterbalanced by a vertically acting tension spring 58 which at its lower end is suitable connected to a cross brace member 59 connected to the member 7, 8 and its upper end is connected as at 60 to the frame member 2.

Figure 3:
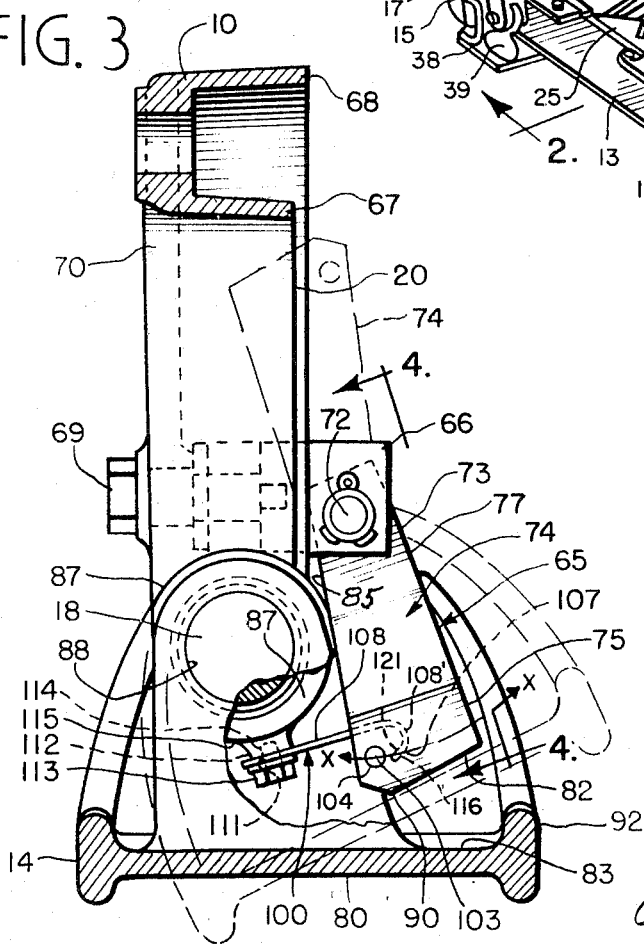
FIG. 3 is a cross-sectional view taken substantially on the line 3-3 of FIG. 2.

The present invention involves a novel gag-limiting structure generally designated 65 which comprises an ear 66 suitably mounted between the flanges 67, 68 of the channel shaped element 10 and is bolted as by bolt 69 to the transverse web 70. The bifurcated ear structure 66 supports between the ears thereof a substantially horizontal pin 72 which provides a pivot for one end 73 of a latch element generally designated 74. Latch element 74 as best seen in FIG. 3 has a relatively wide distal end portion 75 which is offset laterally with respect to the inner end portion 77 in order to place the end portion 75 in vertical alignment with a generally flat bottom portion 80 of the shoe. It will be seen that portion 75 is wider than the portion 77 and that the latch element tapers toward its inner end and is somewhat trapezoidal in shape and has a substantially flat outer edge 82 which is adapted to provide flat face abutment with the upper surface 83 of the shoe as the mower together with the shoe is being tilted upwardly to gag position as seen in phantom lines in FIG. 3. It will be seen that the inner edge 85 of the latch element 74 in its operating position bears against the vertical surface 86 of the embossment 87 which is disposed about the opening 88 through which the pin 18 extends in the leg 20 of the element 10. The latch element is disposed in operating position extending diagonally downwardly and since its center of gravity is beyond the axis of the pin 72, gravity biases the element 74 into its operating position that is lying against the surface 86. It will also be observed that the element 75 has its corner which normally would develop between the surfaces 85 and 82 sheared off as at 90 to insure clearance of this edge about the web 92 of the H section of the inner shoe.

Figure 2:
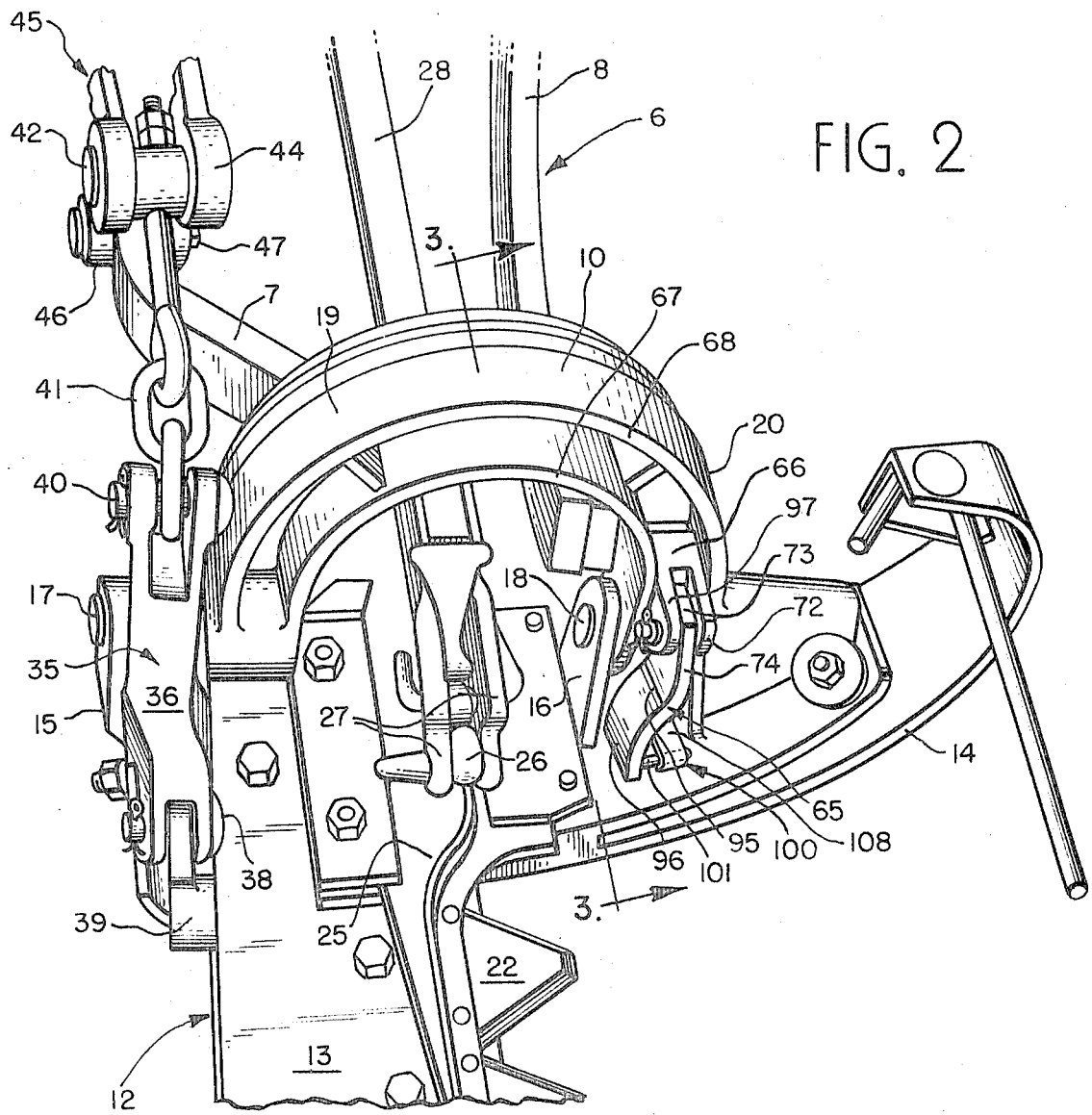
FIG. 2 is a further fragmentary view.

It will also be observed that the offset which is best seen at 94 in FIG. 2 shows the function of providing an abutment surface 95 on the intermediate portion 96 of the latch against the upper edge 97 of the ear structure 66 so that in the elevated position as shown in phantom lines in FIG. 3 the latch is disposed with its center of mass slightly inwardly of the axis of the pin 72. Therefore the latch will remain in such raised position whereupon the operator may manually elevate the mower bar to transport position, that is, vertical secured in such place as is well known. However, when the operator upon placing the mower bar in its normal operating position, and starting the mechanism, the reciprocation of the sickle together with the coupling frame structure causes the latch to swing overcenter and to drop into its operating position from the nonoperating upper phantom line position shown in FIG. 3 to the solid line operating position.

It will be readily apparent that if the operator should actuate the ram, the mower bar will be caused to swing upwardly about the pins 17 and 18 until the top surface 83 of the inner shoe engages the surface 82 whereupon the entire mower assembly will then pivot about the axis of the pins 9 of the coupling frame. It will be apparent that the disposition of the mower bar including the sickle with reference to the pitman will never reach a critical angle such as will cause the pitman 28 to break.

It will also be observed that the latch mechanism will automatically fall into position as soon as the mower is operated and therefore no accidental or forgetful positioning will cause the parts to assume the critical angular relationship which will result in breakage of the pitmam.

The instant invention features a novel lock-to-the-latch generally designated 100 and comprises a transverse pin or catch element 101 which is mounted on the lower end portion 75 of the latch 74 adjacent to its edge 86. The pin 101 extends transversely of the latch and is a roll pin that is C-shaped in cross section of spring material and tightly fits at one end 103 into an opening 104 in the portion 75 of latch 74. The post 101 provides a cylindrical exterior 105 and swings with the latch in an arc about the pivot 72.

The pin 101 is adapted to slide under the lower leg 107 of a hook lock 108 which is made of a light gauge spring steel. The leg 107 merges into a bight portion 108 which in turn merges into an upper leg 109. Leg 109 is of extensive length for upward transverse flexing and has its free end 110 apertured at 111 for admitting the shank 112 of a bolt 113 which is threaded into a receiving aperture 114 formed on the bottom side 115 of the boss 87 of yoke 10 of the mower frame 6.

It will be noted that in the upright position of the yoke 10 as seen in FIG. 3 the hook element extends diagonally upwardly and outwardly over the mower bar and that the lower leg 107 of the hook 108 extends diagonally downwardly and that its undersurface 116 slopes downwardly and inwardly such that when the latch swings downwardly the upper side 117 of the post engages the underside 116 and deflects the element 108 upwardly whereby the post snaps behind the hook portion.

Figure 5:
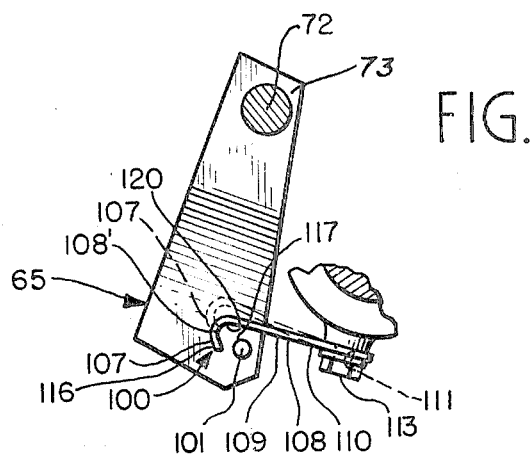
FIG. 5 is a fragmentary side elevational view taken substantially on line 5-5 of FIG. 4.

It will be observed from FIGS. 3 and 5 that the hook and post are not close fitting and that the concavity 120 of the hook portion is intersected by the arc of movement designated X-X (FIG. 3) of the post so that it engages the top side 121 of the lower leg 107 of the hook if the latch should attempt to swing out.

In order to raise the latch manually to a disengaged position, the operator simply raises the spring hook lock to clear the post and manually positions it upright in inoperative position as seen in phantom lines in FIG. 3. If after dropping the mower preparatory to operation, the operator should forget to manually drop the latch, the latch will drop of its own accord due to the oscillations of the mower and the momentum of the latch will carry the pin 101 past the hook portion attendant to deflecting the hook latch upwardly and lock therewith.

Figure 4:
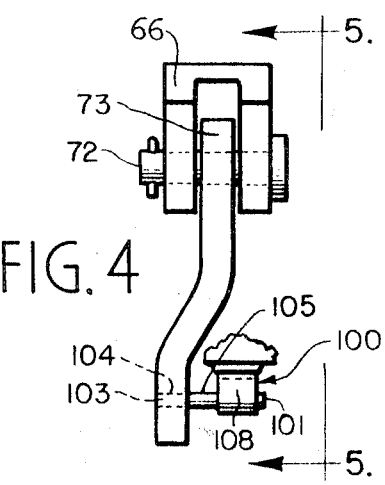
FIG. 4 is an end view of the latch and locking mechanism.

FIG. 4 illustrates the offset relation of the lower portion 75 of the latch with reference to its upper or inner end portion 74. This feature minimizes the projection of the post laterally of the latch so that the hook element may be mounted in substantially vertical alignment with the pivot 72 of the latch and thus obtains a compact structure with the hook element substantially tucked into the latch.

What we claim is:

1. In a mower comprising a support, a coupling member pivoted to said support and swingable about a generally horizontal axis between a lowered position closely adjacent to the ground and an elevated position in which the coupling member is positioned a substantial distance above the ground, a mower, pivot means connecting the mower to the coupling member on an axis generally parallel to said axis, said mower having an extended position adjacent to the ground and swingable vertically to a position in which said mower is inclined upwardly from the coupling member to a gag position and further to a transport position whereat said mower is substantially upright, said mower comprising a reciprocable knife assembly, a drive including a pitman for reciprocating the knife assembly, a connection between one end of the pitman and said knife assembly permitting angular displacement between said knife assembly and pitman within and beyond a working range, releasable means on said coupling member engageable with the mower to limit said angular displacement between the pitman and knife assembly to said working range, said releasable means comprising a latch member pivoted on said coupling member and swingable between a raised inoperative position accommodating pivoting of the mower to a transport position and a lowered operating position engageable with the mower to pivoting within said working range, the improvement comprising: releasable lock means on said members engageable in the operating position of the latch member to prevent inadvertent swinging of the latch member to a position permitting the mower to be pivoted upwardly to a position beyond the working range of the pitman and knife assembly.

2. The invention according to claim 1 and said lock means comprising resilient hook means mounted on the coupling member and catch means on the latch member, said hook means disposed in the path of movement of the catch means with the latch member from raised to lowered positions for automatically interlocking therewith.

3. The invention according to claim 2 and said catch means comprising a pin projecting laterally from the latch member.

4. The invention according to claim 2 and said hook means comprising a relatively long leg having one end connected to the coupling member and oriented to flex vertically and said catch means comprising a laterally disposed element on the latch member and adapted to cam said hook means by flexing the same via said long leg.

5. The invention according to claim 1 and said latch member having laterally offset portions and said lock means disposed between said offset portions.

6. The invention according to claim 1 and said lock means on the coupling member comprising a hook having upper and lower legs and an interconnecting bight and the locking means on the latch comprising a transverse element positioned to cam under the lower leg and hook behind said hook.